US009325571B2

(12) United States Patent  (10) Patent No.: US 9,325,571 B2
Chen  (45) Date of Patent: Apr. 26, 2016

(54) ACCESS PERMISSIONS FOR SHARED CONTENT

(71) Applicant: Dropbox, Inc., San Francisco, CA (US)

(72) Inventor: Alicia Chen, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 245 days.

(21) Appl. No.: 13/903,547

(22) Filed: May 28, 2013

(65) Prior Publication Data

US 2014/0359085 A1  Dec. 4, 2014

(51) Int. Cl.
*H04L 12/24* (2006.01)
*H04L 29/08* (2006.01)
*G06F 9/46* (2006.01)
*G06F 21/62* (2013.01)
*H04L 29/06* (2006.01)

(52) U.S. Cl.
CPC ............ *H04L 41/0803* (2013.01); *G06F 9/468* (2013.01); *G06F 21/6245* (2013.01); *H04L 63/10* (2013.01); *H04L 63/102* (2013.01); *H04L 67/1095* (2013.01); *H04L 67/306* (2013.01)

(58) Field of Classification Search
CPC . G06F 9/468; H04L 41/0803; H04L 67/1095; H04L 67/306
USPC .............................. 709/220; 707/10, E17.01
See application file for complete search history.

(56) References Cited

U.S. PATENT DOCUMENTS

2006/0050312 A1\* 3/2006 Takiyama et al. ............. 358/1.15
2009/0327305 A1\* 12/2009 Roberts et al. ................... 707/10
2014/0258350 A1 9/2014 Duval et al.

OTHER PUBLICATIONS

International Search Report dated Oct. 9, 2014, issued in corresponding International Application No. PCT/US2014/039707.
SugarSync: "Sharing a Folder", May 4, 2012, XP002728686, Retrieved from the Internet: URL:https://web.archive.org/web/20120050409 0157/http://www.sugarsync.com/online-help/Sharing Folders.htm.

(Continued)

*Primary Examiner* — Kristie Shingles
*Assistant Examiner* — Mohammad Yousuf A Mian
(74) *Attorney, Agent, or Firm* — Polsinelli PC

(57) ABSTRACT

Various embodiments of the disclosed technology can configure access permissions for content shared via an online content management system. In one example, a first user of the online content management system can share his directory including files with other users ("recipients"). Upon agreeing to the content sharing from the first user, the recipients can reconstruct local representations of the shared directory and any included file (i.e., local representations of shared content). Access permissions associated with the recipients' local representations of the shared content can be configured to prevent unpermitted/unauthorized modifying or deleting of the local representations by the recipients. However, the first user can maintain read and write permissions, permitting him to make modifications or deletions to the shared content. The recipients' local representations of the shared content can be updated by the online content management system to include the modifications or deletions made by the first user.

18 Claims, 10 Drawing Sheets

(56) References Cited

OTHER PUBLICATIONS

Glenn Fleishman: "Best Online Storage Services for Small Businesses", PCWorld, Apr. 12, 2011, XP002728681, Retrieved from the Internet: URL:http://www.pcworld.com/article/224905/online storage for businesses.html.

Ryan: "What are Collaboration Folders and how do I use them?", support.box.com, Apr. 25, 2013, XP002729759, Retrieved from the Internet: URL:https://web.archive.org/web/20130425025610/https://support.box.com/entries/20358617-What-are-Collaboration-Folders-and-how-do-I-use-them-.

* cited by examiner

ACCESS PERMISSIONS FOR SHARED CONTENT

TECHNICAL FIELD

The present technology pertains to access permissions, and more specifically pertains to configuring access permissions for shared content.

BACKGROUND

Online content storage is becoming more popular. People frequently store, access, or otherwise interact with content stored at online content management systems. Documents, pictures, music, videos, directories, folders, and other types of content items can be stored at online content management systems to be accessed by users of the online content management systems. In some cases, a content item can be shared by one user with another user(s) via an online content management system.

For example, a first entity can store a collection(s) of content items (e.g., a directory(ies), a document(s) within a directory(ies), a photo album, a media playlist, etc.) at its account with an online content management system. In other words, the first entity can be the "owner" of the collection(s) of content items. In one example, the first entity (i.e., owner) can decide to share a directory including documents with one or more other entities (also known as "recipients") via the online content management system. If the first entity modifies (or deletes) the documents being shared with the one or more other entities, then the other entities will have access to the modified documents. Similarly, the other entities can also modify (or delete) the documents that are being shared with them, such that the modification (or deletion) of the documents would be perceivable to the first entity or owner, who initially shared the documents.

In some cases, a recipient may accidentally modify or delete shared content (e.g., documents, directories, collections of content items, etc.) of the owner, which can result in negative effects for the owner. In some cases, the owner may want to share content with another recipient(s), but the owner may be hesitant to do so in fear of the shared content being modified or deleted without the owner's permission. These and other concerns can reduce the overall user experience associated with sharing content via online content management systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for configuring access permissions for content shared via an online content management system. In some embodiments, a user of the online content management system can store data, such as collections of content items, at the online content management system. The user can be considered as the "owner" of the collections of content items.

In one example, the user or owner can decide to share, via the content management system, one or more of his content items with one or more other users ("recipients"). The recipients can choose whether or not to agree to the sharing of the content items by the owner with respect to the recipients. Upon agreeing to the content sharing, the recipients can reconstruct local representations of the shared content items (i.e., shared content). The owner can cause access permissions associated with the recipients' local representations of the shared content to be configured to prevent modifying or deleting of the local representations of the shared content when the modifying or deleting would be in conflict with the owner's defined access settings for the recipients. In other words, for example, owner can cause access permissions associated with the recipients' local representations of the shared content to be configured to prevent unpermitted/unauthorized modifying or deleting of the local representations of the shared content. However, the owner can maintain both read and write permissions, thereby enabling him to permissibly make modifications or deletions with respect to the shared content. The permissible modifications or deletions to the shared content can be reflected or can take effect with respect to the recipient users. In other words, the recipients' local representations of the shared content can be updated by the content management system to include the permissible modifications or deletions made by the owner.

In one example, if a recipient attempts to delete its local representation of a shared file within a local shared directory, the recipient's attempt being in conflict with the owner's defined/assigned access settings for the recipient (e.g., without permission from the owner), then the local representation of the shared file can be downloaded again from the content management system and then reconstructed or restored at the recipient (e.g., at the recipient's account and/or computing device). As such, the local representation of the shared file can be synced with the owner's file via the content management system. In another example, if the recipient attempts to modify, in conflict with the settings assigned to the recipient by the owner (e.g., without the owner's permission), the recipient's local representation of a shared file, then a copy of the local representation of the shared file can be created locally. The attempted modification by the recipient can be applied to the local copy (i.e., a supplemental/additional file or content item), thereby leaving the local representation of the shared file (downloaded from the content management system) unmodified. Therefore, the local representation of the shared file can again be synced with the owner's file via the content management system. Further, in some embodiments, the owner can choose which recipient(s) has what access permissions. For example, the owner can allow some recipient users to have read/write access to the shared content, while other recipients are given read-only access.

It is important to note that the various embodiments and/or examples discussed herein are for illustrative purposes only. A person having ordinary skill in the art would recognize various other manners or approaches that can be utilized consistent with the scope of the present disclosure. Various other functions and advantages are described and suggested below as may be provided in accordance with the various embodiments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for configuring access permissions for content shared via an online content management system. In one example, a first user of the online content management system can share his collection(s) of content items, such as a directory including files, with other users ("recipients"). Upon agreeing to the content sharing from the first user, the recipients can reconstruct local representations of the shared directory and any included file (i.e., local representations of shared content). Access permissions associated with the recipients' local representations of the shared content can be configured to prevent unpermitted/unauthorized modifying or deleting of the local representations by the recipients. However, the first user can maintain read and write permissions, permitting him to make modifications or deletions to the shared content. The recipients' local representations of the shared content can be updated by the online content management system to include the modifications or deletions made by the first user.

Figure 1:
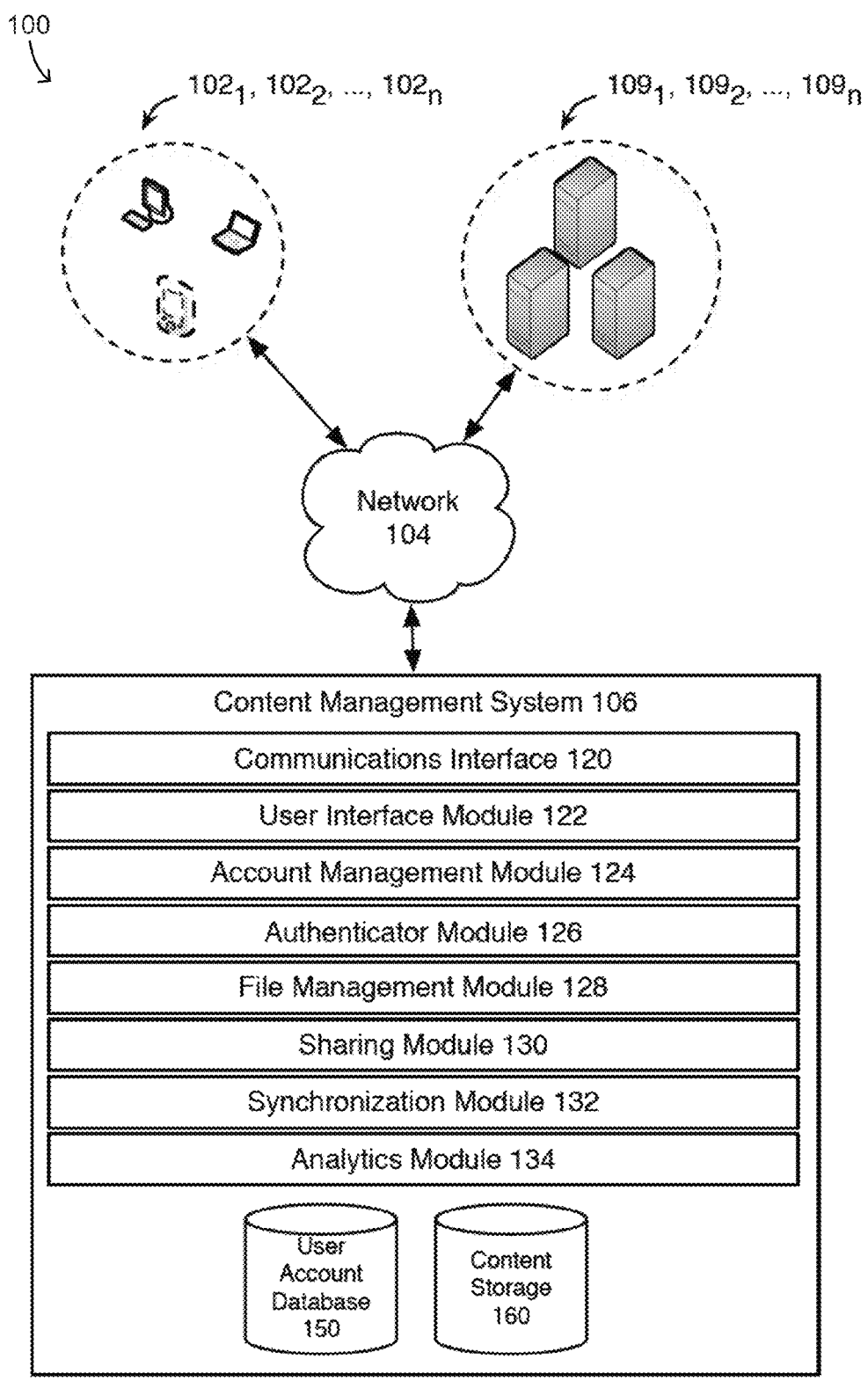
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102, can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
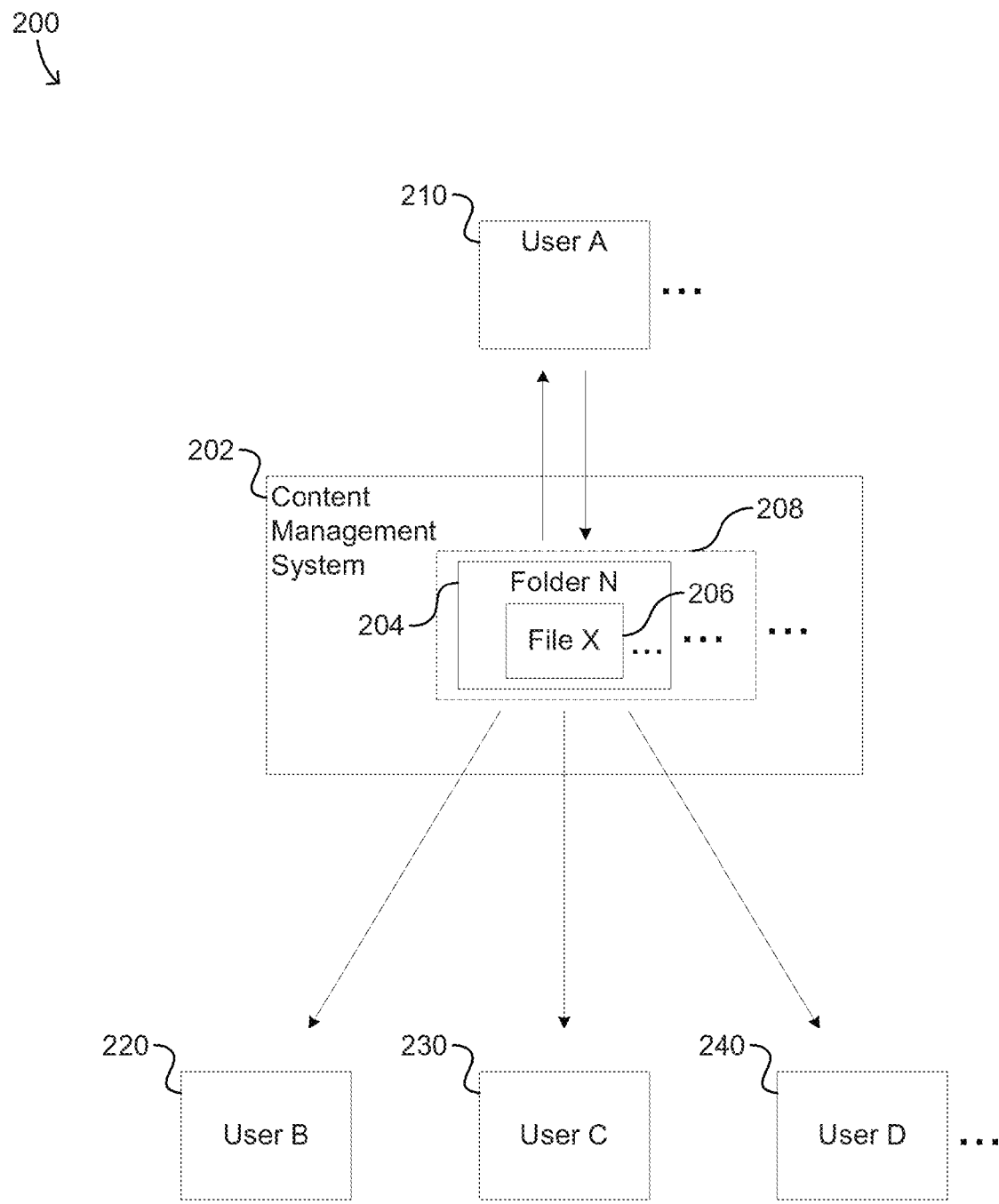
FIG. 2 shows an exemplary environment in which access permissions for shared content can be configured.

With reference now to FIG. 2, FIG. 2 shows an exemplary environment in which access permissions for shared content can be configured. Exemplary environment 200 in FIG. 2 can include content management system 202 (e.g., content management system 106 in FIG. 1). Content management system 202 can be used to store data, such as directories and/or other content items. For example, as shown in FIG. 2, content management system 202 can store, among other things, folder N 204. Folder N 204 can include content items such as file X 206, which are also stored with content management system 202.

As shown in FIG. 2, content management system 202 can be used by a plurality of users, such as User A 210, User B 220, User C 230, and User D 240. In some embodiments, each user can have a respective user account. For example, an entity (e.g., user) can sign up or register for an account (e.g., user account) with content management system 202. In some embodiments, content management system 202 can provide the account to the entity along with an amount of storage space for the entity to use. In some cases, a user account can correspond to a standard user account, a free user account, a premium user account, a paid user account, a temporary user account, a guest user account, etc.

In FIG. 2, folder N 204 including file X 206 can be associated with (e.g., owned by, belong to, etc.) User A 210 (or the user account of User A 210). For example, User A 210 can have signed up for a user account with content management system 202. Content management system 202 can have allocated an amount of storage space 208 for User A's user account. User A 210 can then store folder N 204 including file X 206 within storage space 208 allocated to User A's account by content management system 202.

In one example, User A 210 can decide that he wants to share folder N 204 including file X 206 with three colleagues, User B 220, User C 230, and User D 240, via content management system 202. User A 210 can have at least two ways to share folder N 204 and file X 206. Under the first approach, User A 210 can send a link associated with folder N 204 on system 202, and the three colleagues (User B 220, User C 230, and User D 240) can choose to access the link and download a local copy of the shared folder N 204 including a local copy of file X 206. Under the second approach, User A 210 can share the directory of folder N 204 including file X 206 with the three colleagues such that any of the four users (User A 210, User B 220, User C 230, or User D 240) can modify (including delete) the contents of folder N 204, namely file X 206.

In this example, file X 206 can be a business report that User A 210 periodically revises. User A 210 may want his three colleagues to be able to see the latest revised version of the report at all times. As such, User A 210 should not use the first approach because, under the first approach, the three colleagues would be downloading local copies of the shared content (e.g., file X 206) at each colleague's respective computing device such that any future revisions or modifications to the shared content (e.g., file X 206) by User A 210 would not be reflected in the local copies of the three colleagues. Thus, User A 210 should share the content using the second approach.

However, under the second approach, all users with whom the content is shared (e.g., Users A, B, C, and D) can have read and write permissions with respect to the shared content. In other words, under the second approach, even though all of the users with whom the content is shared can access the latest version of the shared content, any of those users can modify or even delete the shared content.

Continuing with the example, even though User A 210 desires his colleagues to have the latest version of the financial report (e.g., file X 206), User A 210 nonetheless does not want his colleagues to be able to modify or delete the report without his permission. Accordingly, various embodiments of the present disclosure enable one or more access permissions of shared content to be configured in order to address the above mentioned concerns and other issues.

Figure 3:
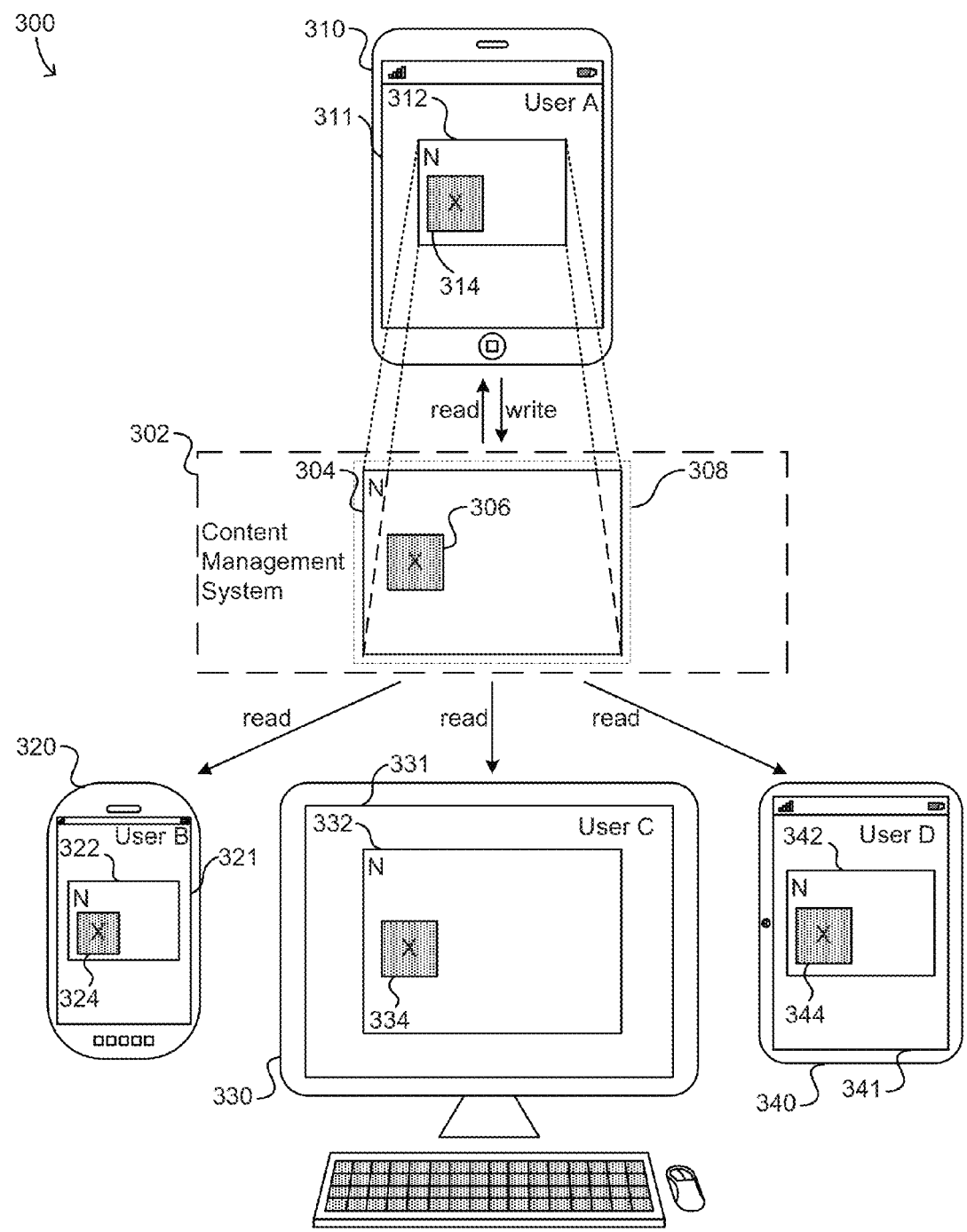
FIG. 3 shows an exemplary system embodiment for configuring access permissions for shared content.

Referring now to FIG. 3, an exemplary system embodiment for configuring access permissions for shared content is shown. Exemplary system embodiment 300 can include content management system 302 (e.g., content management system 106 in FIG. 1), computing device 310, computing device 320, computing device 330, and computing device 340. In the example of FIG. 3, computing device 310 can be associated with (e.g., used by, owned by, etc.) User A, computing device 320 can be associated with User B, computing device 330 with User C, and computing device 340 with User D.

In some embodiments, each of the computing devices (e.g., 310, 320, 330, and 340) can be running a client-side application (e.g., 311, 321, 331, and 341, respectively) configured to operate with content management system 302, as shown in the example of FIG. 3. Each client-side application (e.g., 311, 321, 331, and 341) can enable its respective user (e.g., User A, User B, User C, and User D, respectively) to interact with data stored at the respective user's account.

In FIG. 3, each client-side application (i.e., client application, client app, client software, etc.) can enable its respective user to view, access, or otherwise interact with collections of content items stored at the respective user's account, including content that has been shared with the respective user's account by another user account. As shown in FIG. 3, for example, User A "owns" content item N 304 (e.g., directory N 304) as well as content item X 306 (e.g., file X 306), which is included in directory N 304. User A can store directory N 304 at his user account 308 with content management system 302. Moreover, a local representation 312 of directory N 304 can be maintained at User A's computing device 310. A local representation 314 of content item X 306 can also be maintained at User A's computing device 310.

Continuing with the example, User A (i.e., owner) can share his directory N 304 and content item X 306 with one or more other users (i.e., recipients), such as User B, User C, and User D. In some embodiments, User A can utilize client application 311 running on computing device 310 to transmit a command to content management system 302 indicating that User A wants to share directory N 304 including content item X 306 with Users B, C, and D. Content management system 302 can then send a message to each of recipient Users B, C, and D (i.e., to the user account for each of Users B, C, and D) asking whether or not the recipient user agrees to accept User A's shared content.

In response to a recipient user's agreement to accept the sharing of the content by User A, content management system 302 can communicate with the client application for that recipient user (e.g., client app 321 for User B, client app 331 for User C, client app 341 for User D, etc.). Each client app can facilitate in downloading and generating a reconstructed version of the shared content at the computing device of a respective recipient user. In this example, Users B, C, and D agree to accept User A's shared content, so client apps 321, 331, and 341, respectively, can download data representative of directory N 304 and content item X 306 from content management system 302. Each of client apps 321, 331, and 341 can then facilitate in generating reconstructed versions of directory N 304 and content item X 306 for its respective user. This results in reconstructed directory N 322 and reconstructed content item X 324 being generated at User B's computing device 320, reconstructed directory N 332 and reconstructed content item X 334 being generated at User C's computing device 330, and reconstructed directory N 342 and reconstructed content item X 344 at User D's computing device 340.

Furthermore, in order to prevent the recipient users (e.g., Users B, C, and D) from modifying or deleting the shared content (e.g., directory N and content item X), in some embodiments, each client app can communicate with the operating system of its respective user's computing device to configure the access permission(s) associated with the shared content (i.e., associated with the reconstructed version of the shared content on the respective user's computing device). As shown in FIG. 3, access permissions for the recipient users have been configured to allow the recipient users to initiate read commands, but not write commands. In other words, the access permissions for the reconstructed content at the recipient users' computing devices have been configured to be read-only. As such, in FIG. 3, the recipient users (e.g., Users B, C, and D) can read (e.g., view, open, execute, etc.) the shared content, but they do not have access to write to (e.g., modify, delete) the shared content.

However, being the owner of the shared content, User A maintains read and write permissions. User A can view, open, run, modify, and/or delete the shared content. Moreover, if User A modifies or deletes the shared content (e.g., content item X in directory N), then each of the reconstructed versions of the shared content at the recipient users will be updated as well to include the modification or deletion made by User A. In other words, modifications or deletions of the shared content by User A can be reflected or take effect at the reconstructed versions of the shared content at the recipient users' devices, but the recipient users with read-only permissions cannot readily modify or delete shared content.

Further, in some embodiments, the owner of a shared collection of content items, having read and write permissions, can add additional content items to the shared collection such that recipient users with whom the collection is shared will also generate reconstructed versions of the additional content items in their reconstructed collections. In other words, for example, if User A adds file Z (not shown in FIG. 3) to directory N 312, then file Z will be replicated/reconstructed at directory N 304 of system 302, as well as at each recipient user's reconstructed directory N 322, 332, and 342.

Moreover, in some cases, a recipient user may want to terminate or cease the sharing of content by the owner with respect to the recipient user. In some embodiments, the recipient user can remove the (entire) reconstructed directory or collection of content from his computing device. This can result in the reconstructed data included in the reconstructed directory or collection also being removed from the recipient user's computing device. This action by the recipient user can terminate or cease the sharing of content by the owner to the recipient user.

Figure 4:
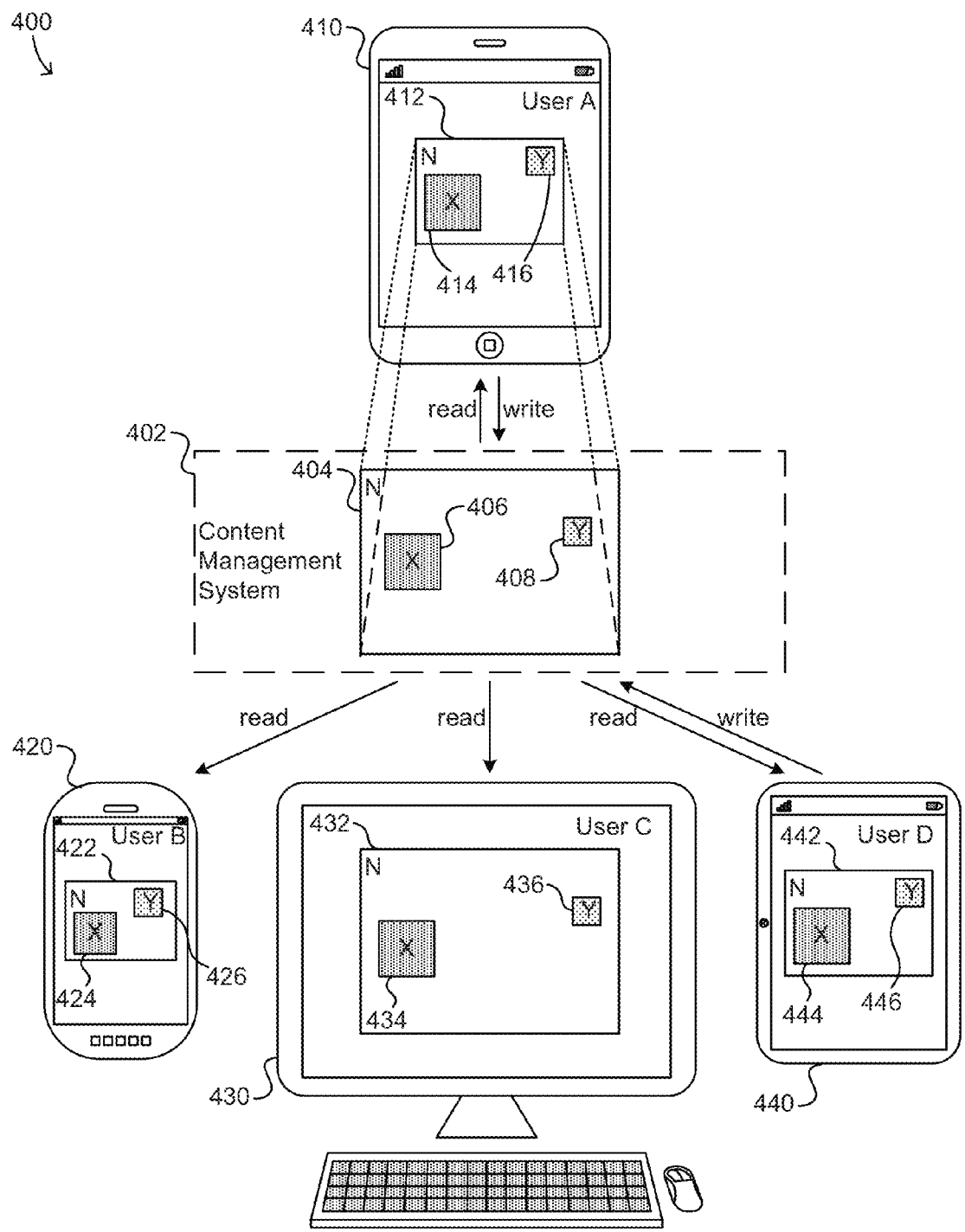
FIG. 4 shows an exemplary system embodiment for configuring access permissions for shared content.

Turning now to FIG. 4, an exemplary system embodiment for configuring access permissions for shared content is shown. Exemplary system embodiment 400 can include content management system 400 and computing devices 410, 420, 430, and 440. In the example of FIG. 4, computing device 410 can be associated with User A, who can be the owner of a collection(s) of content items, such as content item N 404 (e.g., directory N 404). In this example, directory N 404 can initially include content item X 406 (e.g., file X 406). It follows that local representations 412 and 414 of directory N 404 and content item X 406, respectively, can be included at User A's computing device 410.

In the example of FIG. 4, User A has shared his directory N (e.g., 404, 414) with recipient Users B, C, and D. As such, computing device 420 of User B has locally generated reconstructed version 422 of directory N and reconstructed version 424 of content item X. Similarly, computing device 430 of User C has locally generated reconstructed version 432 of directory N and reconstructed version 434 of content item X. Likewise, computing device 440 of User D has locally generated reconstructed version 442 of directory N and reconstructed version 444 of content item X.

In some embodiments, User A can choose to give both read and write permissions to one or more recipient users. For example, User A can elect to give read and write permissions to User D, while granting read-only permissions to Users B and C, as shown in FIG. 4. Continuing with the example, now having both read and write permissions, User D can add content item Y 446 to its local version of directory N 442. Since User D has permission (given by User A) to write data to the shared directory (e.g., directory N), the addition of content item Y 446 can take effect at content management system 402 as well as at each user's local representation of directory N (e.g., User A's local directory N 412, User B's local directory N 422, and User C's local directory N 432). In other words, directory N 404 at system 402 can replicate/reconstruct content item Y 408 due to User D's addition of content item Y 446 into his local directory N 442. Similarly, due to User D's action, User A's local directory N 412 can be updated to replicate/reconstruct content item Y 416, User B's local directory N 422 can replicate/reconstruct content item Y 426, and User C's local directory N 432 can replicate/reconstruct content item Y 436. Along the same lines, in some embodiments, User D can modify or delete existing shared content (not shown in FIG. 4), such that the modification or deletion by User D can be reflected or take effect at system 302 and at the local directory N for each of the other users (Users A, B, and C) with whom directory N is shared.

Figure 5:
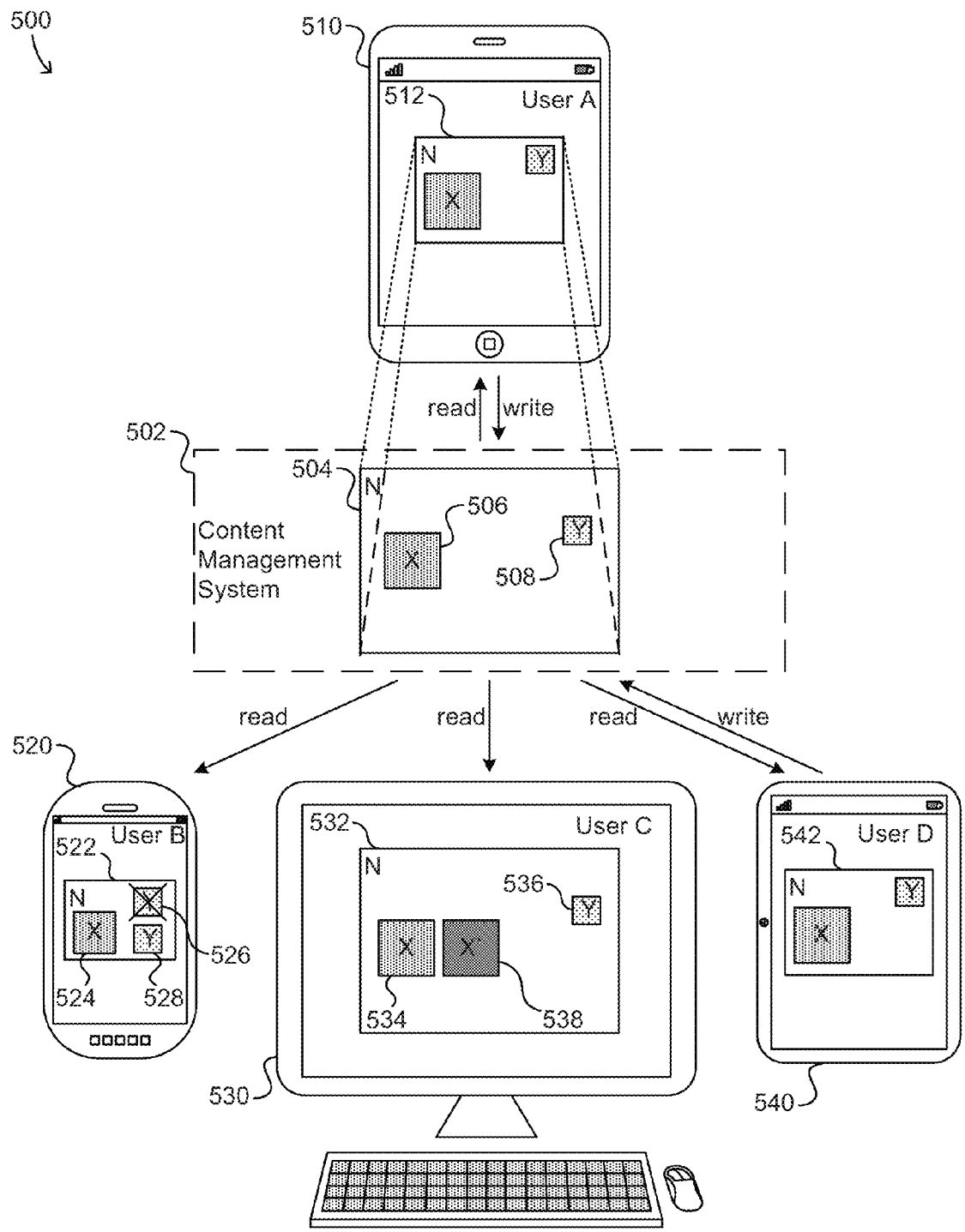
FIG. 5 shows an exemplary system embodiment for configuring access permissions for shared content.

FIG. 5 shows an exemplary system embodiment for configuring access permissions for shared content. Exemplary system embodiment 500 of FIG. 5 can include content management system 502 and computing devices 510, 520, 530, and 540. In the example of FIG. 5, content item N 504 (e.g., directory N 504) at content management system 502 can include content item X 506 (e.g., file X 506) and content item Y 508 (e.g., file Y 508). Directory N 504 can be shared among Users A, B, C, and D.

Since directory N 504 is shared among Users A, B, C, and D, each user can generate a local representation of directory N including local representations of content items X and Y. In particular, User B's computing device 520 can include local directory N 522 with local content items X 524 and Y 526, while User C's computing device 530 can include local directory N 532 with local content items X 534 and Y 536, and likewise for Users A and D.

Continuing with the example, in some embodiments, the owner of directory N 504 can choose which shared users get what permissions. As such, for example, User A can grant read-only permissions to Users B and C, while giving read/write permissions to User D. Thus, User D can access, modify, and/or delete the shared content (e.g., content items X and Y), whereas Users B and C can only access the shared content.

In some cases, the client app running on a user's device can monitor the shared content such that if the user attempts, in conflict with the user's assigned access settings/permission (e.g., without permission), to delete the shared content, then the shared content can be restored at the user's account and/or device. In some embodiments, if the user deletes, in conflict with the user's assigned access settings/permission (e.g., without permission), a shared content item, then the user's device (or the client app running on the user's device) can recognize this conflicting (e.g., unpermitted/unauthorized) deletion and can communicate with system 502 to re-download, reconstruct, and/or restore the content item. For example, in FIG. 5, User B has read-only permissions with respect to shared content items X 524 and Y 526. As such, if User B attempts to delete content item Y 526, content item Y 526 can be replaced/reconstructed/restored 528.

Moreover, in some instances, the client app running on the user's device can monitor the shared content such that if the user attempts to modify, in conflict with the user's assigned settings, shared content, then the modification can be applied to a newly created local copy of the shared content, while leaving the shared content unmodified. In other words, for example, if the user attempts to make a modification to a shared content item without permission, the user's device (or the client app running on the user's device) can facilitate in generating a local copy of the shared content item (e.g., a supplemental content item) and apply the modification to the local copy. For example, as shown in FIG. 5, User C has read-only permissions with respect to shared content items X 534 and Y 536. Thus, if User C attempts to make a modification to content item X 534, then content item X' 538 can be locally created as a copy of content item X 534 and the modification can be applied to content item X' 538, thereby leaving content item X 534 unmodified. Further, content item X' 538 would not be reflected, effected, and/or updated with respect to system directory N 504 or the other local directory N representations (512, 522, 542), because User C does not have write permissions.

Furthermore, in some cases, a recipient user may want to terminate or cease the sharing of content by the owner with respect to the recipient user. In some embodiments, the recipient user can remove the (entire) reconstructed directory or collection of content from his computing device. This can result in the reconstructed data included in the reconstructed directory or collection also being removed from the recipient user's computing device. This action by the recipient user can terminate or cease the sharing of content by the owner to the recipient user.

Figure 6:
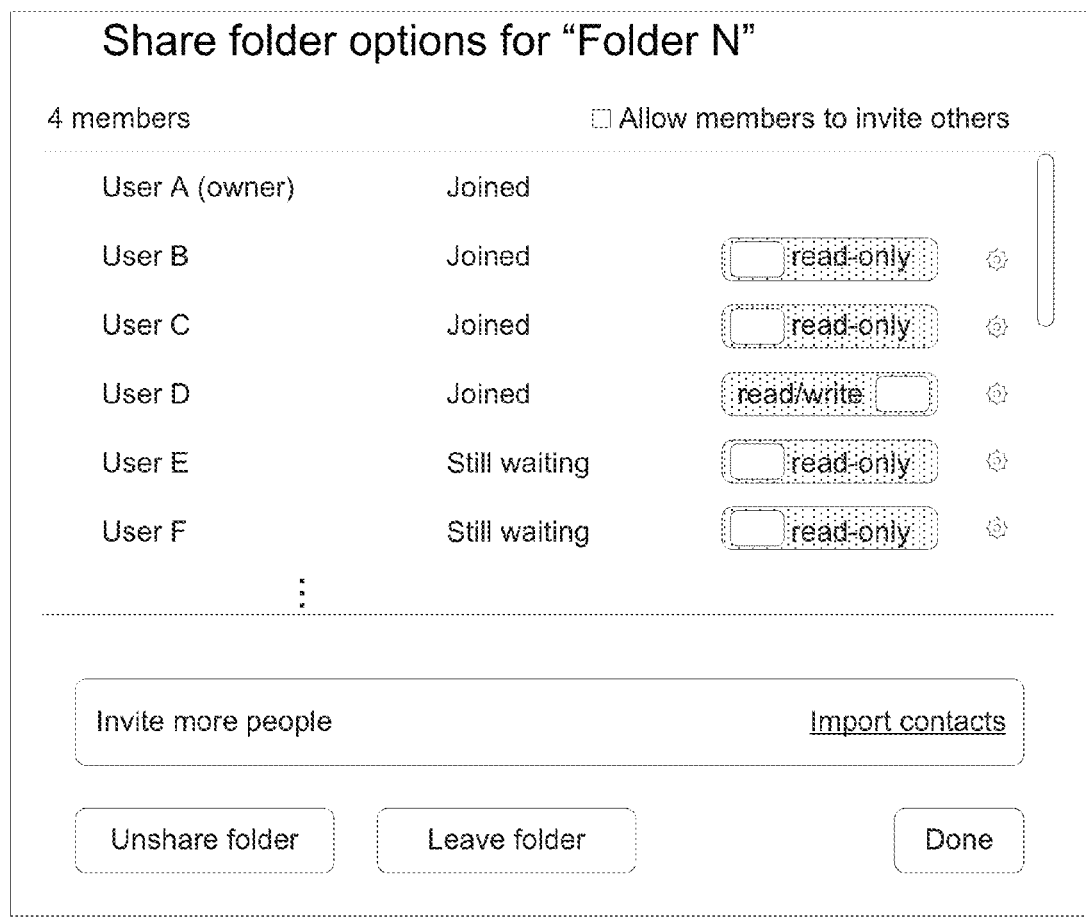
FIG. 6 shows an exemplary user interface for configuring access permissions for shared content.

Regarding FIG. 6, an exemplary user interface for configuring access permissions for shared content is shown. In FIG. 6, exemplary user interface 600 can enable a user of the content management system to configure access permissions for shared content. For example, User A can sign into his account with the content management system and utilize exemplary user interface 600 to manage content sharing.

In some embodiments, there can be one or more inputs useful for configuring access permissions for each of the users with whom the content is shared. As shown in the example of FIG. 6, User A can utilize toggle switches included in interface 600 to configure what access permissions the recipient users (e.g., Users B, C, D, E, F, etc.) will have. In this example, Users B and C have agreed to User A's content sharing with them and they have read-only permissions. User D has also accepted User A's content sharing, but User D has been granted both read and write permissions. Moreover, Users E and F have been invited by User A to access the shared content but they have not yet agreed or accepted. If and when Users E and F agree to or accept the content sharing, then they will have read-only permissions as set by User A.

Figure 7:
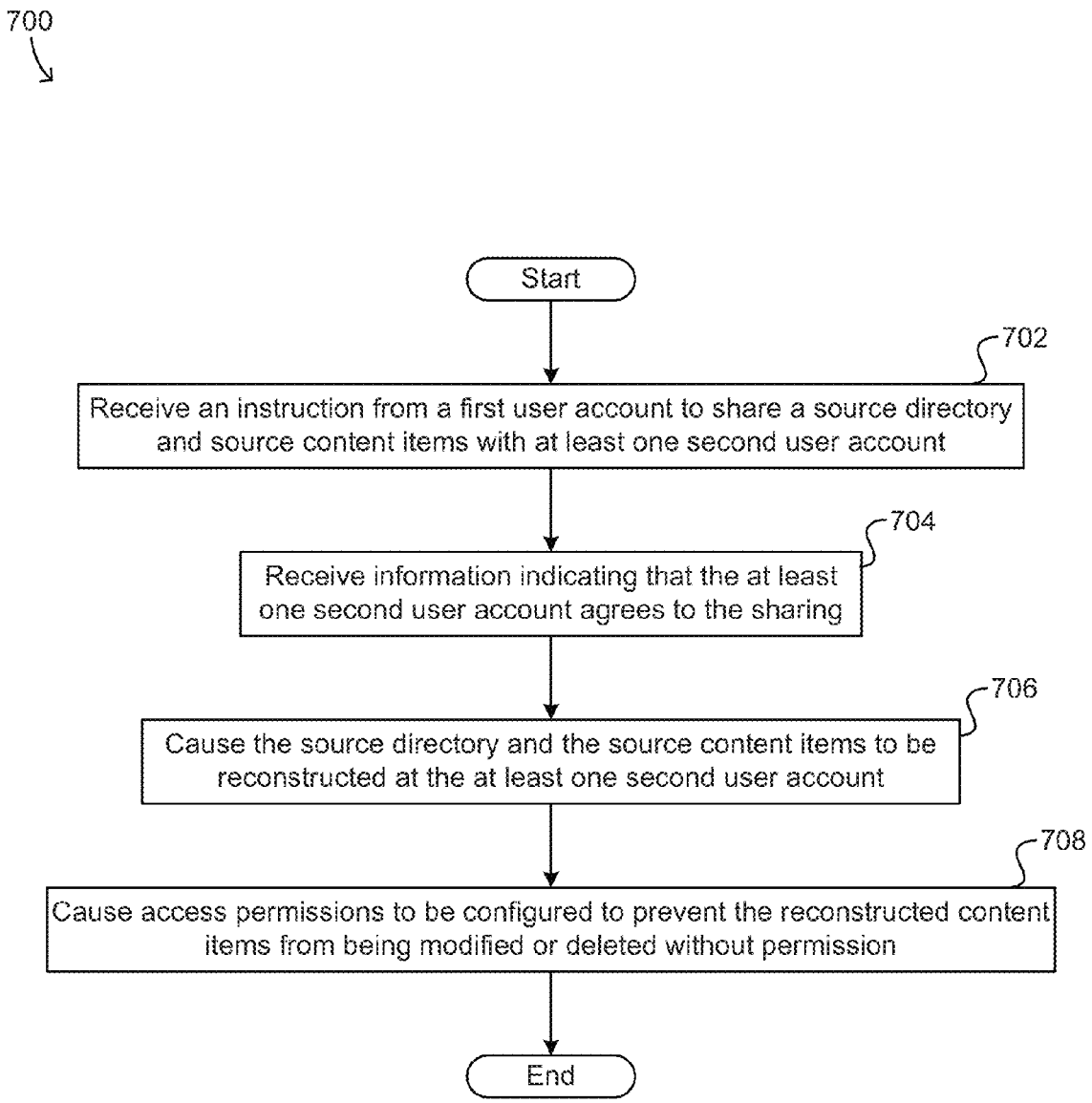
FIG. 7 shows an exemplary method embodiment for configuring access permissions for shared content.

FIG. 7 shows an exemplary method embodiment for configuring access permissions for shared content. It should be understood that there can be additional, fewer, or alternative steps performed in similar or alternative orders, or in parallel, within the scope of the various embodiments unless otherwise stated. Exemplary method embodiment 700 can receive an instruction from a first user account to share a source collection of content, such as a source directory, with at least one second user account, at step 702. The first user account and the at least one second user account can be associated with an online content management system. Moreover, the directory can include one or more source content items also to be shared with the at least one second user account. At step 704, exemplary method embodiment 700 can receive information indicating that the at least one second user account agrees to the source directory and the one or more source content items being shared with the at least one second user account. In other words, the at least one second user account can indicate acceptance of content sharing from the first user account.

Method 700 can then cause the source directory and the one or more source content items to be reconstructed, at the at least one second user account. The source directory and the one or more source content items can be reconstructed into a reconstructed directory and one or more reconstructed content items within the reconstructed directory, respectively, at step 706. Then method 700 can cause one or more access permissions to be configured to prevent modifying or deleting the one or more reconstructed content items at the at least one second user account, wherein the modifying or deleting would cause conflict with one or more settings assigned for the at least one second user account by the first user account.

Figure 8:
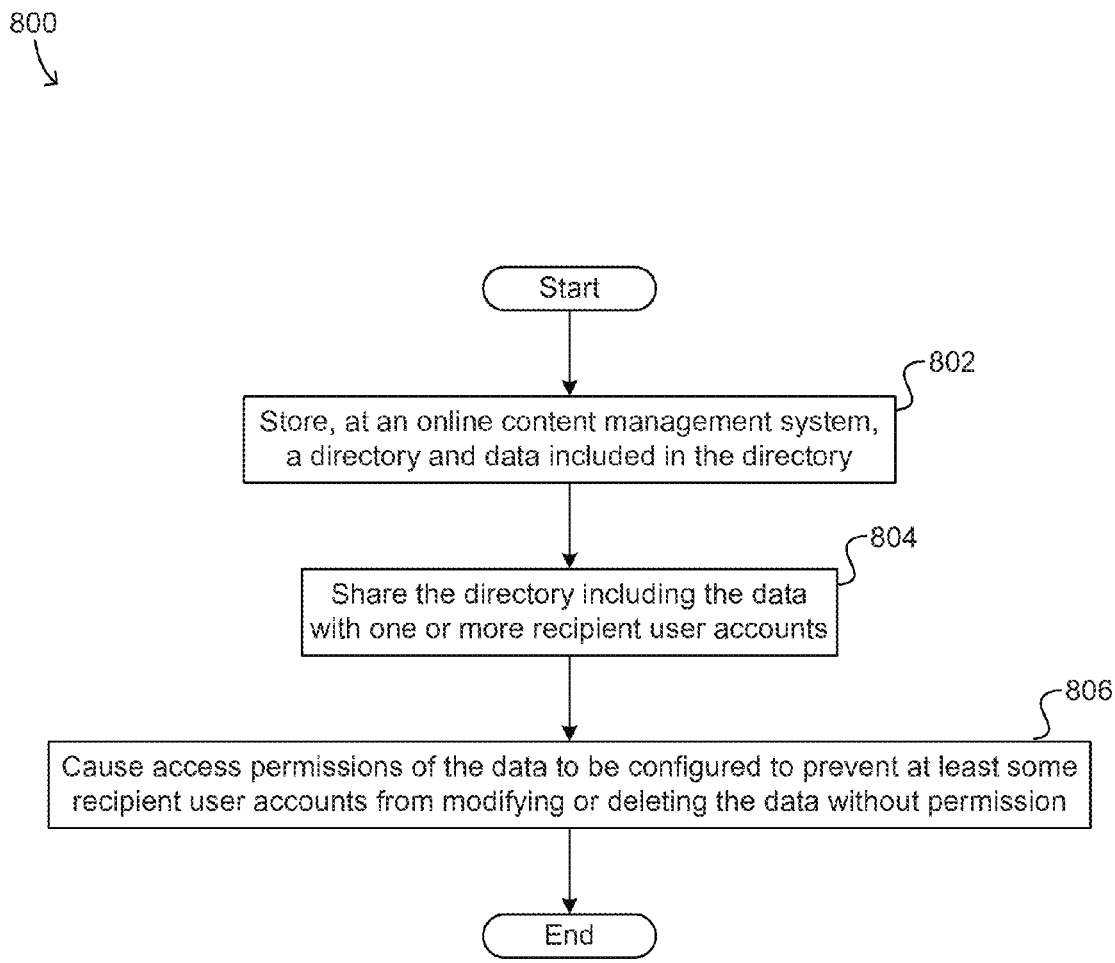
FIG. 8 shows an exemplary method embodiment for configuring access permissions for shared content.

FIG. 8 shows an exemplary method embodiment for configuring access permissions for shared content. As previously mentioned, it should be understood that there can be additional, fewer, or alternative steps performed in similar or alternative orders, or in parallel, within the scope of the various embodiments unless otherwise stated. Exemplary method embodiment 800 can begin, at step 802, with storing, at an online content management system, a collection of content, such as a directory, and data included in the collection or directory. In some embodiments, the directory and the data can be associated with a source user account of the online content management system. In some cases, the source user account can have read and write permissions with respect to the data included in the directory.

At step 804, method 800 can share the directory including the data with one or more recipient user accounts. In some embodiments, when a permissible modification or deletion occurs with respect to the data included in the directory, the modification or deletion can be reflected, effected, or updated at the source user account and at the one or more recipient user accounts. Step 806 can include causing one or more access permissions associated with the data included in the directory to be configured to prevent at least some of the one or more recipient user accounts from modifying or deleting the data included in the directory, wherein the modifying or deleting would cause conflict with one or more settings assigned to the one or more recipient user accounts.

Figure 9:
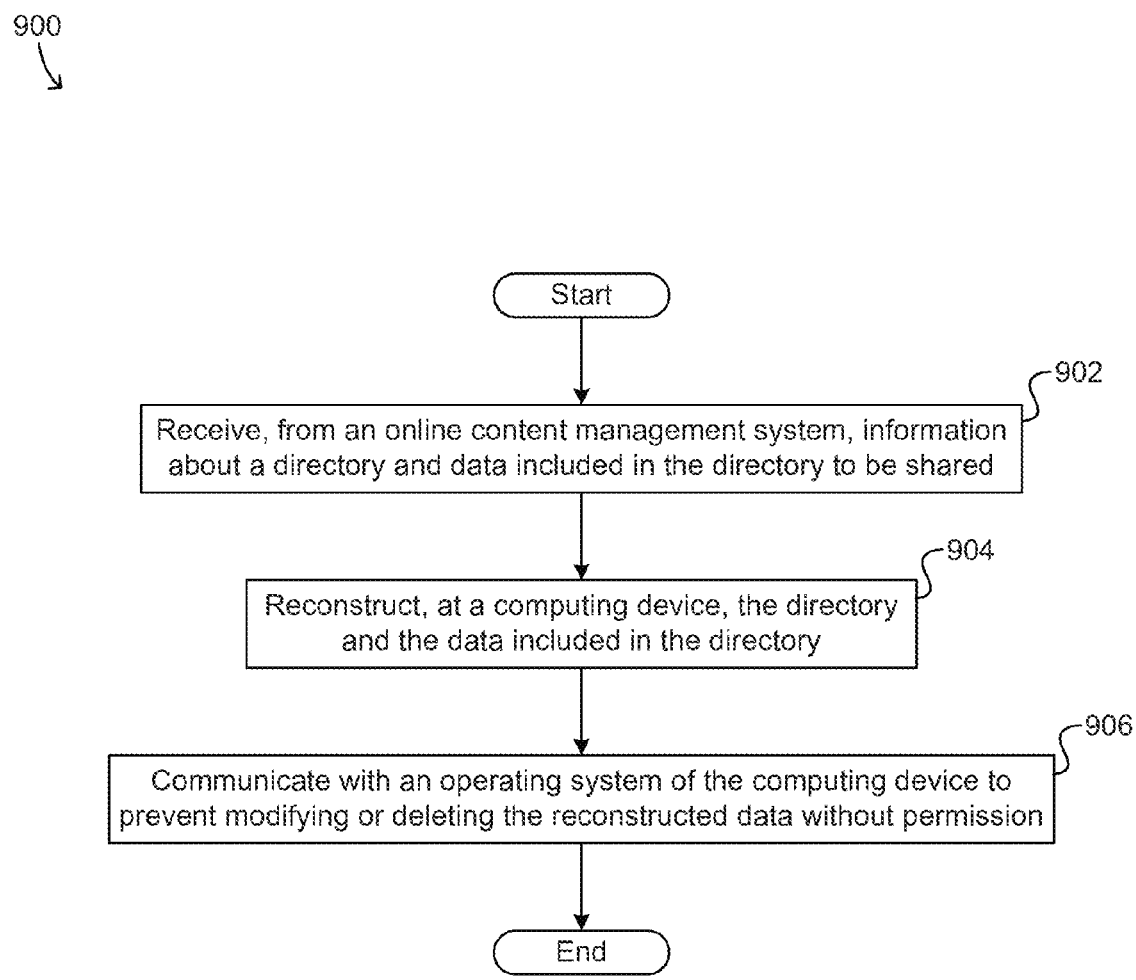
FIG. 9 shows an exemplary method embodiment for configuring access permissions for shared content.

FIG. 9 shows an exemplary method embodiment for configuring access permissions for shared content. Again, it should be understood that there can be additional, fewer, or alternative steps performed in similar or alternative orders, or in parallel, within the scope of the various embodiments unless otherwise stated. At step 902, exemplary method embodiment 900 can receive, from an online content management system, information about a collection of content, such as a directory, and data included in the directory to be shared with a computing device. The directory including the data can be associated with a source user account.

Step 904 can include reconstructing, at the computing device, the directory and the data included in the directory based, at least in part, on the received information. Then method 900 can communicate with an operating system of the computing device to configure an access permission associated with the reconstructed data included in the reconstructed directory at the computing device. The access permission can be configured to prevent modifying or deleting the reconstructed data at the computing device, wherein the modifying or deleting would cause conflict with one or more settings assigned to the computing device by the source user account.

In some embodiments, the one or more settings associated a shared content item's access permission can be stored in the metadata of the shared content item.

In some embodiments, read-only shared content items can be applied to all clients, including application programming interface (API) clients. In one example, the content management system can provide API's to third party software developers who develop applications (i.e., apps) for the content management system. In this example, if the third party developers use the API's to gain access to a user's read-only data, then the read-only access permissions for the user's read-only data should still be enforced when the data is transmitted to and/or received from the applications of the third party developers.

Various embodiments can also monitor unpermitted/unauthorized changes to access permissions. In some embodiments, the client app can determine that one or more access permissions have been modified at a user's computing device, without permission/authorization. In response, the client app can communicate with the operating system to revert the one or more access permissions in accordance with one or more previous configurations of the access permissions.

Figure 10A:
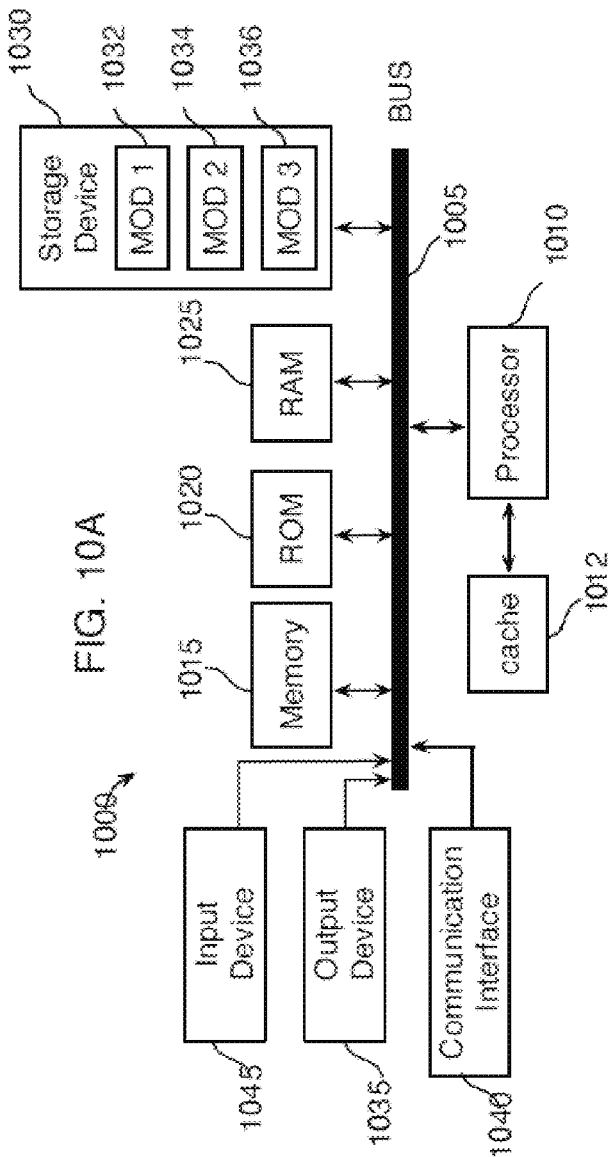
FIG. 10A shows an exemplary possible system embodiment for configuring access permissions for shared content.
Figure 10B:
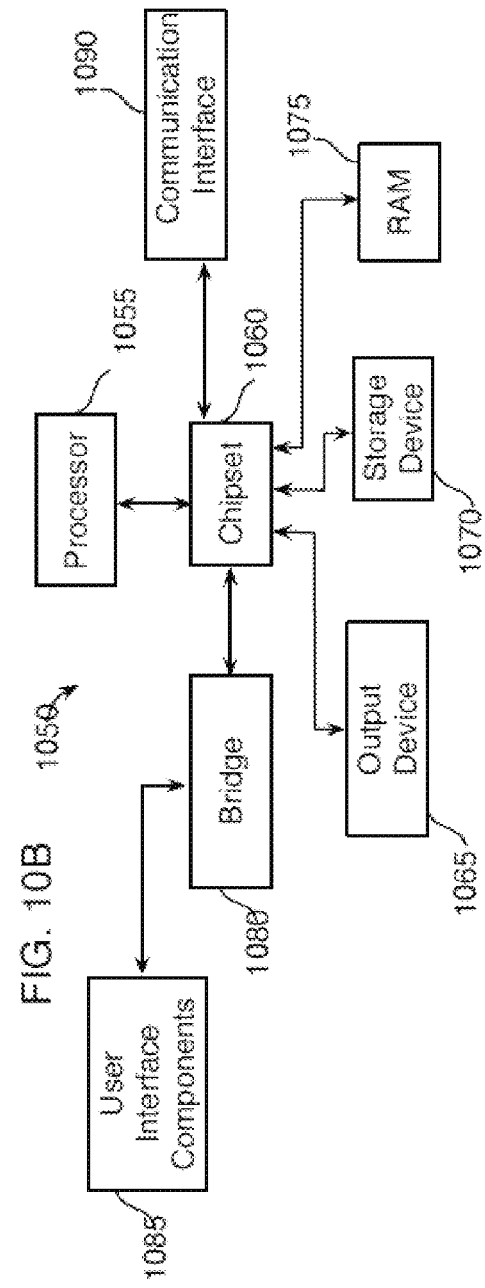
FIG. 10B shows an exemplary possible system embodiment for configuring access permissions for shared content.

With reference now to FIG. 10A and FIG. 10B, FIG. 10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer-readable medium storing computer executable instructions for causing a computing device to perform a method comprising:
receiving, from an online content management system, information about a collection of content and data included in the collection to be shared with the computing device, the collection including the data being associated with a source user account;
reconstructing, at the computing device, the collection and the data included in the collection based, at least in part, on the received information; and
communicating with an operating system of the computing device to configure an access permission associated with the reconstructed data included in the reconstructed collection at the computing device, the access permission being configured to prevent modifying or deleting the reconstructed data at the computing device, wherein the modifying or deleting would cause conflict with one or more settings assigned to the computing device by the source user account;
determining that the access permission has been modified at the computing device in conflict with the one or more settings assigned to the computing device by the source user account; and
communicating with the operating system to revert the access permission in accordance with a previous configuration of the access permission.

2. The non-transitory computer-readable medium of claim 1, wherein the method further comprises:
determining that a deletion with respect to the reconstructed data has been attempted at the computing device, the deletion being attempted in conflict with the one or more settings assigned to the computing device by the source user account; and
restoring the reconstructed data based, at least in part, on information about the data received from the online content management system.

3. The non-transitory computer-readable medium of claim 1, wherein the method further comprises:
determining that a modification with respect to the reconstructed data has been attempted at the computing device, the modification being attempted in conflict with the one or more settings assigned to the computing device by the source user account; and
generating a local copy of the reconstructed data at the computing device based, at least in part, on the modification, thereby leaving the reconstructed data unmodified.

4. The non-transitory computer-readable medium of claim 1, wherein the method further comprises:
removing the reconstructed collection from the computing device, wherein the reconstructed data included in the reconstructed collection is also removed from the computing device, and wherein the collection including the data is ceased from being shared with the computing device.

5. The non-transitory computer-readable medium of claim 1, wherein the method further comprises:
receiving a command from the source user account to allow the computing device to modify or delete the reconstructed data; and
communicating with the operating system to update the access permission to allow the computing device to modify or delete the reconstructed data.

6. The non-transitory computer-readable medium of claim 5, wherein the method further comprises:
determining that a modification or deletion has occurred with respect to the reconstructed data, the modification or deletion being initiated at the computing device; and
transmitting, to the online content management system, information about the modification or deletion with respect to the reconstructed data, the information about the modification or deletion being useful for updating the data included in the collection.

7. A system for configuring access permissions, comprising:
a processor;
a non-transitory computer readable medium; and
computer readable instructions, stored on the non-transitory computer readable medium, that when executed by the processor to:
receive from an online content management system, information about a collection of content and data included in the collection to be shared with the system, the collection including the data being associated with a source user account;
reconstruct the collection and the data included in the collection based, at least in part, on the received information;
communicate with an operating system to configure an access permission associated with the reconstructed data included in the reconstructed collection at the computing device, the access permission being configured to prevent modifying or deleting the reconstructed data at the computing device, wherein the modifying or deleting would cause conflict with one or more settings assigned to the computing device by the source user account;
determine that the access permission has been modified at the computing device in conflict with the one or more settings assigned to the computing device by the source user account; and
communicate with the operating system to revert the access permission in accordance with a previous configuration of the access permission.

8. The system of claim 7, wherein the computer readable instructions further cause the system to:
determine that a deletion with respect to the reconstructed data has been attempted at the computing device, the deletion being attempted in conflict with the one or more settings assigned to the computing device by the source user account; and
restore the reconstructed data based, at least in part, on information about the data received from the online content management system.

9. The system of claim 7, wherein the computer readable instructions further cause the system to:
determine that a modification with respect to the reconstructed data has been attempted at the computing device, the modification being attempted in conflict with the one or more settings assigned to the computing device by the source user account; and
generate a local copy of the reconstructed data at the computing device based, at least in part, on the modification, thereby leaving the reconstructed data unmodified.

10. The system of claim 7, wherein the computer readable instructions further cause the system to:
- remove the reconstructed collection from the computing device, wherein the reconstructed data included in the reconstructed collection is also removed from the computing device, and wherein the collection including the data is ceased from being shared with the computing device.

11. The system of claim 7, wherein the computer readable instructions further cause the system to:
- receive a command from the source user account to allow the computing device to modify or delete the reconstructed data; and
- communicate with the operating system to update the access permission to allow the computing device to modify or delete the reconstructed data.

12. The system of claim 11, wherein the computer readable instructions further cause the system to:
- determine that a modification or deletion has occurred with respect to the reconstructed data, the modification or deletion being initiated at the computing device; and
- transmit, to the online content management system, information about the modification or deletion with respect to the reconstructed data, the information about the modification or deletion being useful for updating the data included in the collection.

13. A computer-implemented method executed on a computing device, the method comprising:
- receiving, from an online content management system, information about a collection of content and data included in the collection to be shared with the computing device, the collection including the data being associated with a source user account;
- reconstructing, at the computing device, the collection and the data included in the collection based, at least in part, on the received information; and
- communicating with an operating system of the computing device to configure an access permission associated with the reconstructed data included in the reconstructed collection at the computing device, the access permission being configured to prevent modifying or deleting the reconstructed data at the computing device, wherein the modifying or deleting would cause conflict with one or more settings assigned to the computing device by the source user account;
- determining that the access permission has been modified at the computing device in conflict with the one or more settings assigned to the computing device by the source user account; and
- communicating with the operating system to revert the access permission in accordance with a previous configuration of the access permission.

14. The computer-implemented method of claim 13, further comprising:
- determining that a deletion with respect to the reconstructed data has been attempted at the computing device, the deletion being attempted in conflict with the one or more settings assigned to the computing device by the source user account; and
- restoring the reconstructed data based, at least in part, on information about the data received from the online content management system.

15. The computer-implemented method of claim 13, further comprising:
- determining that a modification with respect to the reconstructed data has been attempted at the computing device, the modification being attempted in conflict with the one or more settings assigned to the computing device by the source user account; and
- generating a local copy of the reconstructed data at the computing device based, at least in part, on the modification, thereby leaving the reconstructed data unmodified.

16. The computer-implemented method of claim 13, further comprising:
- removing the reconstructed collection from the computing device, wherein the reconstructed data included in the reconstructed collection is also removed from the computing device, and wherein the collection including the data is ceased from being shared with the computing device.

17. The computer-implemented method of claim 13, further comprising:
- receiving a command from the source user account to allow the computing device to modify or delete the reconstructed data; and
- communicating with the operating system to update the access permission to allow the computing device to modify or delete the reconstructed data.

18. The computer-implemented method of claim 17, further comprising:
- determining that a modification or deletion has occurred with respect to the reconstructed data, the modification or deletion being initiated at the computing device; and
- transmitting, to the online content management system, information about the modification or deletion with respect to the reconstructed data, the information about the modification or deletion being useful for updating the data included in the collection.

* * * * *